(12) United States Patent
Roethling et al.

(10) Patent No.: US 11,667,502 B2
(45) Date of Patent: Jun. 6, 2023

(54) INDUSTRIAL TRUCK, CONFIGURED FOR DRIVERLESS, AUTONOMOUSLY ACTING OPERATION FOR A LOAD TO BE TRANSPORTED

(71) Applicant: Robert Bosch GmbH, Stuttgart (DE)

(72) Inventors: Frank Roethling, Stuttgart (DE); Alessandro Heim, Stuttgart (DE); Johannes Schild, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 17/034,289

(22) Filed: Sep. 28, 2020

(65) Prior Publication Data

US 2021/0101789 A1  Apr. 8, 2021

(30) Foreign Application Priority Data

Oct. 2, 2019 (DE) ..................... 10 2019 215 180.9

(51) Int. Cl.
*B66F 9/06* (2006.01)
*B66F 9/075* (2006.01)
*G05D 1/02* (2020.01)

(52) U.S. Cl.
CPC ............ *B66F 9/063* (2013.01); *B66F 9/0755* (2013.01); *G05D 1/024* (2013.01); *G05D 1/0272* (2013.01); *G05D 2201/0216* (2013.01)

(58) Field of Classification Search
CPC ...... B66F 9/063; B66F 9/0755; B66F 17/003; G05D 1/024; G05D 1/0272; G05D 2201/0216

See application file for complete search history.

(56) References Cited

U.S. PATENT DOCUMENTS

| 2011/0077814 A1* | 3/2011 | Haberer ................ G01S 7/4812 |
| | | 701/28 |
| 2019/0220005 A1* | 7/2019 | Flottran ................ B66F 17/003 |
| 2020/0101971 A1* | 4/2020 | Fan ........................ G05D 1/024 |

FOREIGN PATENT DOCUMENTS

| DE | 10 2018 104 648 A1 | 9/2019 |
| EP | 3 241 801 A1 | 11/2017 |
| EP | 3 453 672 A1 | 3/2019 |
| EP | 3 511 289 A1 | 7/2019 |
| WO | 2015/121818 A2 | 8/2015 |

\* cited by examiner

*Primary Examiner* — Tyler J Lee
*Assistant Examiner* — Yufeng Zhang
(74) *Attorney, Agent, or Firm* — Maginot, Moore & Beck LLP (57) ABSTRACT

An industrial truck, configured for driverless, autonomously-acting operation for a load to be transported, includes at least a control system configured to control and to steer the industrial truck, and an evaluation unit configured to generate a signal for stopping the industrial truck. A detector device configured to recognize persons and/or objects located in a route is connected to the control system. The control system is configured to check a protective field and/or a warning field of the detector device, and the protective field and/or the warning field is automatically switchable in dependence on a position of the industrial truck and/or detected obstacles in the route of the industrial truck.

10 Claims, 9 Drawing Sheets

INDUSTRIAL TRUCK, CONFIGURED FOR DRIVERLESS, AUTONOMOUSLY ACTING OPERATION FOR A LOAD TO BE TRANSPORTED

This application claims priority under 35 U.S.C. § 119 to patent application no. DE 10 2019 215 180.9, filed on Oct. 2, 2019 in Germany, the disclosure of which is incorporated herein by reference in its entirety.

The disclosure relates to an industrial truck (automated guided vehicle, AGV), configured for driverless, autonomously acting operation for a load to be transported. In particular, the disclosure is used in a robot vehicle for the transport of loads. Lifting industrial trucks and non-stacking lift trucks and also corresponding combinations are also comprised.

BACKGROUND

The handling of loads is gaining increasing significance with progressing automation technology. In practice, efforts are usually taken to avoid collisions with persons by the use of laser scanners having PLrd (performance level according to ISO 13849-1:2006).

To unload the transported material, a so-called "supermarket" (parking or storage region) is entered, wherein a laser scanner is switched off for the approach to the unloading position, which has the result that transported material already present in the supermarket cannot be recognized or can only be recognized with inadequate reliability during the entry. Therefore, the supermarket is considered to be a danger zone, in which only authorized persons are permitted access. These persons are typically warned upon entry of the AGV into a danger zone by flashing signals and acoustic signals. Moreover, a person enclosed in a danger zone can usually stop the AGV via an emergency stop button. Some AGVs accept that transported materials are unloaded having a certain safety distance from one another, which results in an increased space requirement. The entry region being identified as a danger zone and thus being blocked as a footpath is also known.

SUMMARY

Proceeding therefrom, it is the object of the disclosure to provide an industrial truck, configured for driverless, autonomously acting operation for a load to be transported, which remedies or even avoids the mentioned disadvantages. In particular, increasing the protection of persons during the unloading of a transported material in a danger zone, omitting an additional emergency stop button, and/or reducing the space requirement are to be achieved in a simply designed manner. A further goal can consist of implementing safe traversing of pedestrian paths during the entry into a danger zone, wherein the switching off of the laser scanner or excessively early switching over to the narrow protective field using PLd is reliably prevented.

These objects are achieved by an industrial truck according to the independent claim. Further designs of the disclosure are specified in the dependent claims. It is to be noted that the description, in particular in conjunction with the figures, sets forth further details and refinements of the disclosure, which are combinable with the features from the claims.

An industrial truck contributes thereto, which is configured for driverless, autonomously acting operation for a load to be transported and comprises at least the following:

a control system, which controls and steers the industrial truck, an evaluation unit, which generates a signal for stopping the industrial truck, wherein a detector device for recognizing persons and/or objects located in the route is connected to the control system, wherein the control system is configured to check a protective and/or warning field of the detector device and wherein the protective and/or warning field is switchable automatically in dependence on the position of the industrial truck and/or detected obstacles in the route of the industrial truck.

The industrial truck provided here has the advantage that after an obstacle has been recognized in the supermarket via the rearward laser scanner (by means of a warning field), the activation of a narrower protective field enables the recognition of an enclosed person. The AGV stops without contact and an additional emergency stop button is no longer required. In the normal case (no enclosed person), the narrower protective field "looks" under the transported material carrier (dolly), on which the loaded transported material is placed, wherein the space in the "supermarket aisle" is optimally utilized. It is ensured by reliably monitored wheel odometry that the switching to a narrow protective field only takes place in the danger zone. That is to say, the laser scanner field necessary for safe traversal of the pedestrian path is selected before beginning the reverse travel and is necessarily maintained for a predetermined travel path.

A driverless industrial truck can be a powered vehicle possibly including any trailers, which is intended to drive independently. For this purpose, the industrial truck can interact with a guidance system in the floor or the surroundings, which specifies the driving routes.

"Load" means an object to be handled, including its mass, dimensions, state, and/or arrangement. The load can (only) consist of a cargo. The load can also comprise the cargo and a transport device for the cargo, for example, a transport cart, a pallet, a floor roller, etc. "Load handling" which can be executed by the industrial truck is understood in particular as raising, lowering, load transfer, and/or load processing.

The control system includes an automatic device, which controls (for example, activate/deactivates) and steers (possibly monitored by sensors) the industrial truck and its associated devices. The system of the industrial truck comprises the driverless control system, which can be part of the industrial truck and/or separate therefrom. The control system can comprise a computing unit which is provided in or on the industrial truck.

The evaluation unit can be connected to a sensor system (for example, of the detector device), preferably electrically and to conduct data, and can be configured to process its signals. The evaluation unit is configured in particular to perform an analysis of the data of the sensor system or the detector device, so that persons, things, objects (in the region behind the industrial truck) can be unambiguously detected or determined with respect to their location/position. The location determined in the evaluation unit can be compared to or influenced by predetermined parameters (which are stored and/or set, for example), wherein then a regulation signal is also transmitted to the controller and the operation of the industrial truck can be influenced by the evaluation unit. The evaluation unit can be a separate (electronic) assembly, but it is also possible that the evaluation unit is part of the control system for controlling the industrial truck itself. The (at least) one data-conducting connection between evaluation unit and control unit and the sensor system can be implemented in a wired or wireless manner.

The detector device is configured to generate a signal which is representative of a (rearward) surrounding region of the industrial truck. This can be interpreted by the evaluation unit and can cause an instruction to the control system, by which the industrial truck can be stopped by means of a braking system under the predetermined operating conditions, in particular before falling below a predeterminable safety distance to a (recognized, predefined) object. The detector device for recognizing persons and/or objects located in the (rearward) route is connected to the evaluation unit and/or control device.

The detector device is configured in particular to monitor protective and/or warning fields, i.e., to detect persons, objects, etc. entering therein during the (rearward) travel of the industrial truck. Depending on the travel direction, the velocity, and/or the steering angle, different predefined regions can be monitored. Each predefined region can consist of a warning field and a protective field, wherein possibly multiple warning fields and/or protective fields are also predeterminable. If a warning field is interrupted, the evaluation unit can then cause the industrial truck to (only) reduce the velocity (without directly stopping). If a protective field is interrupted, the evaluation unit then triggers (automatically, i.e., in particular without active action of a person and/or immediately due to an instruction of the evaluation unit) a braking function, wherein, for example, the drive is disconnected from the power supply (safe torque off (STO)). If the protective field is no longer interrupted, the drive of the industrial truck can then be activated again and the travel can thus be continued automatically, for example, after 2 seconds.

The detector device (and possibly also the evaluation unit and/or the control system) are configured to automatically switch over protective and/or warning field currently to be set in dependence on the (current) position of the industrial truck and/or (currently) detected obstacles in the route of the industrial truck.

According to a first example, the control system recognizes a special driving cycle (for example, on the basis of the velocity, the travel direction, etc.) or route (for example, on the basis of a guide route on the floor), wherein a predetermined protective and/or warning field of the detector device matching thereto is automatically predetermined/activated in dependence on these parameters. For this purpose, data sets can be provided in the control system, the evaluation unit, and/or the detector device as to which dimensions or allocations of protective and/or warning field are to be performed in which position of the industrial truck. Automatic switching over can take place, for example, upon entry into a defined supermarket.

Another example is that the control system (possibly with the evaluation unit and/or the detector device) recognizes a specific pattern in the current protective and/or warning field and then a differing predetermined protective and/or warning field of the detector device is independently predetermined/activated. For example, if a load carrier (dolly) is recognized on the basis of its outer wheels, the protective and/or warning field is possibly narrowed, so that the industrial truck can move back farther and then the protective and/or warning field extends between the wheels and under the load carrier.

The control system preferably comprises a control unit for the desired travel direction and the speed, a control unit for the movement, and a control unit for the safety of the industrial truck. The first control unit (robot control unit, RCU), the second control unit (motion control unit, MCU), and the third control unit (safety control unit, SCU) can be part of the control system.

The detector device advantageously comprises a laser scanner. Laser scanners scan a predetermined surrounding region using laser light. A laser beam is emitted by the scanner, which is then reflected again from the surroundings, an object, or an obstacle and received again by a receiving optical unit. The laser can be deflected via a deflection mirror, which is pivoted. The runtime of the laser from the scanner until it is received again is determined and evaluated, wherein a distance up to an obstacle (person, object, etc.) in the scanning region can thus be concluded. A type of "image" can also be generated of the relative location which multiple detected objects have in relation to one another. A more complex analysis of the surroundings is thus also possible.

The laser scanner is preferably arranged on the rear part of the industrial truck. The viewing direction or protective and/or warning fields generated thereby thus extend in particular from the rear part of the industrial truck over predeterminable regions, for example, over the entire industrial truck width.

The control system expediently comprises an evaluation unit. The evaluation unit is advantageously integrated into the control system.

The laser scanner is preferably connected to the third control unit (SCU).

The second control unit (MCU) and the third control unit (SCU) are advantageously configured to check the surroundings for obstacles on the basis of predetermined protective and warning fields of the laser scanner.

Multiple protective fields (regions in front of, behind, and adjacent to the industrial truck) are preferably predefined in the laser scanner.

The third control unit (SCU) is expediently configured to activate and/or deactivate the protective fields.

The control system is preferably configured to monitor the route of the industrial truck by wheel odometry.

In the industrial truck provided here, the safety control unit and the travel control unit check the surroundings for obstacles on the basis of predetermined protective and warning fields of a laser scanner. At latest when an unexpected object is recognized in a protective field, the safety control unit stops the vehicle. Multiple protective fields (regions in front of, behind, or adjacent to the vehicle) are predefined in the laser scanner and may be activated or deactivated by the safety control unit.

The industrial truck can accordingly also be embodied having a system for data processing, comprising means for executing the above-mentioned steps of the method using the detector device. In particular, the system is configured to establish persons and/or objects located in the route by means of the detector device, in particular using the evaluation unit, wherein the protective and/or warning field is switchable automatically in dependence on the position of the industrial truck and/or detected obstacles in the route of the industrial truck, and/or if a (predefinable) impermissible change is established (at least in the warning field), the (immediate) stopping of the travel of the industrial truck is initiated.

As a precaution, it is to be noted that the designation of elements using numerals ("first", "second", . . . ) is regularly only performed for differentiation and does not have to specify a dependence or sequence of the elements. With regard to the sensors, for example, this means that their attachment (stationary, carried) and/or position (on a carrier, gripper, etc.) can be freely selected independently of the designation and/or in accordance with the technical conditions.

BRIEF DESCRIPTION OF THE DRAWINGS

The disclosure and the technical environment are explained in greater detail hereinafter on the basis of figures. Identical components are identified by identical reference signs. The illustrations are schematic and are not provided to illustrate size relationships. The explanations set forth with respect to individual details of a figure are extractable and freely combinable with facts from other figures or the above description, unless necessarily resulting otherwise for a person skilled in the art or such a combination being explicitly forbidden. In the schematic figures.

DETAILED DESCRIPTION

Figure 1:
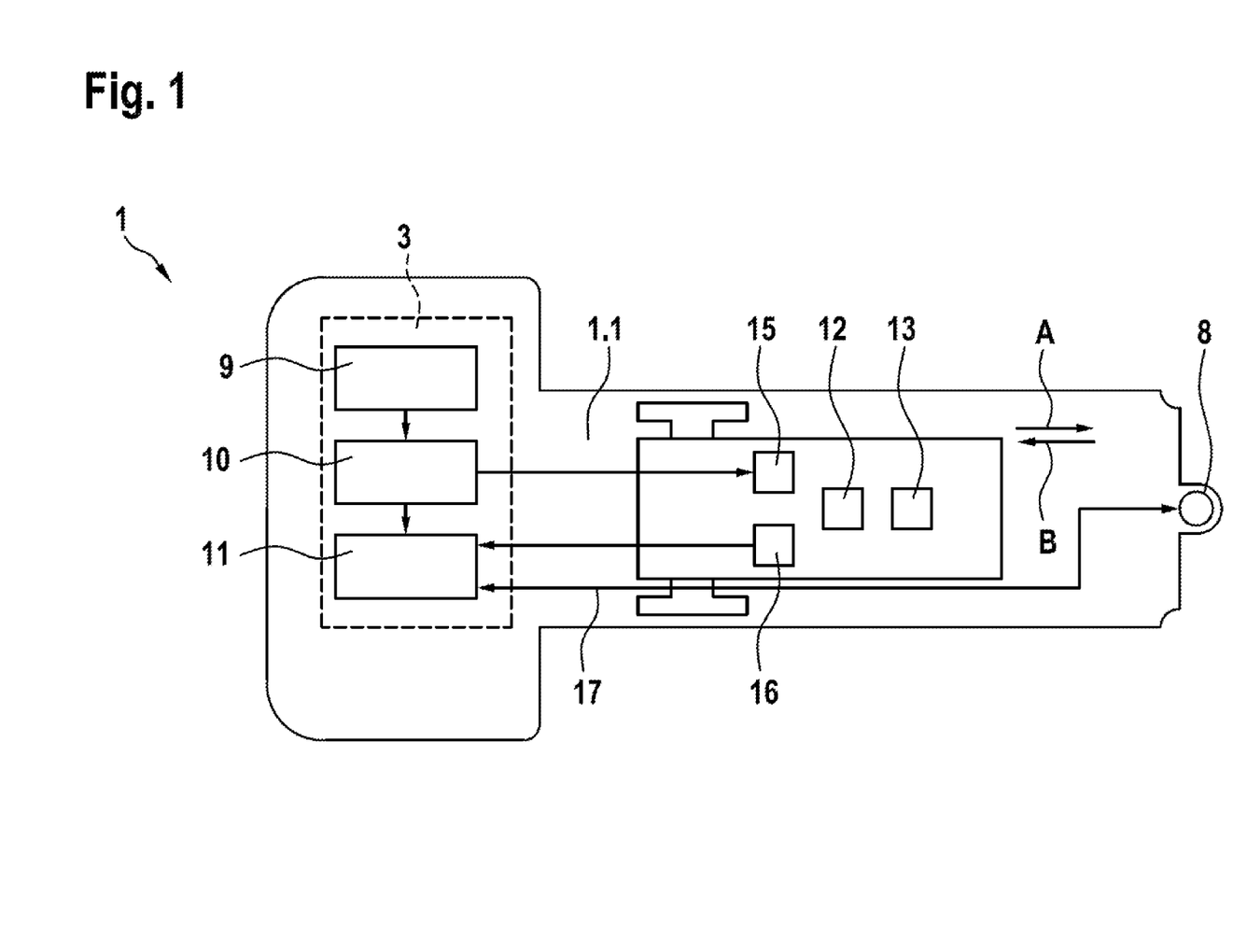
FIG. 1: shows a top view of a driverless, autonomously acting industrial truck having a control system and a detector device.

FIG. 1 shows a top view of a driverless, autonomously acting industrial truck 1 having a control system 3 and a laser scanner 8.

The industrial truck 1 provided here, having a cargo area 1.1 for a load 2 to be transported (see FIG. 3), comprises at least the control system 3, which controls and steers the industrial truck 1, and an evaluation unit 4 (see FIG. 2), which also generates, for example, a signal for stopping the industrial truck 1. The detector device 5 (see FIG. 2) is connected to the control system 3, wherein the detector device 5 comprises a laser scanner 8. The control system 3 comprises a first control unit 9 for the desired travel direction and the velocity, a second control unit 10 for the movement, and a third control unit 11 for the safety of the industrial truck 1. A first motor for the travel movement of the industrial truck 1 is identified by 12 and a second motor for the vertical adjustment of a raising and lowering device 14 (see FIG. 2) is identified by 13. A first rotary encoder (target speed) is identified by 15 and a second rotary encoder is identified by 16. Movement directions are identified by A, B. The industrial truck 1 can be an active shuttle (AS).

Figure 2:
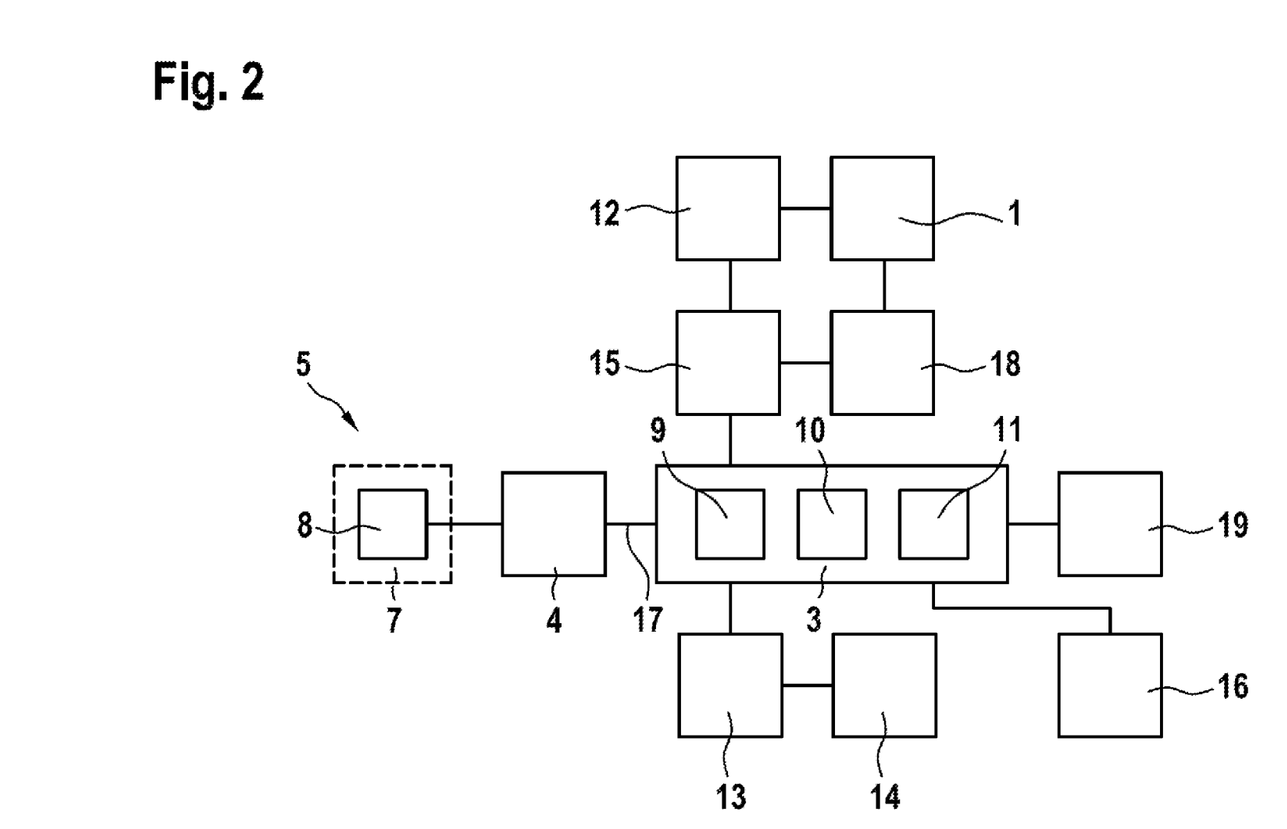
FIG. 2: shows a block diagram having the control system, to which a laser scanner and drive motors are connected.

FIG. 2 illustrates a block diagram having the control system 3 for the industrial truck 1 provided here. The laser scanner 8 is connected via the evaluation unit 4 to the electronic control system 3 by a data-conducting connection 17. The second control unit 10 is connected via the first speed encoder 15 (target speed) to the motor 12. The second speed encoder 16 is connected to the third control unit 11. A braking system 18, which can generate a signal to the first motor 12 to stop the industrial truck 1, is connected to the control system 3. The braking system 18 can also act on the industrial truck 1 alone or in combination with the first motor 12. Furthermore, the second motor 13 for the drive of the raising and lowering device 14 is connected to the control system 3. The detector device 5 can also be used to recognize the position of the raising and lowering unit 14. A memory element is identified by 19.

Figure 3:
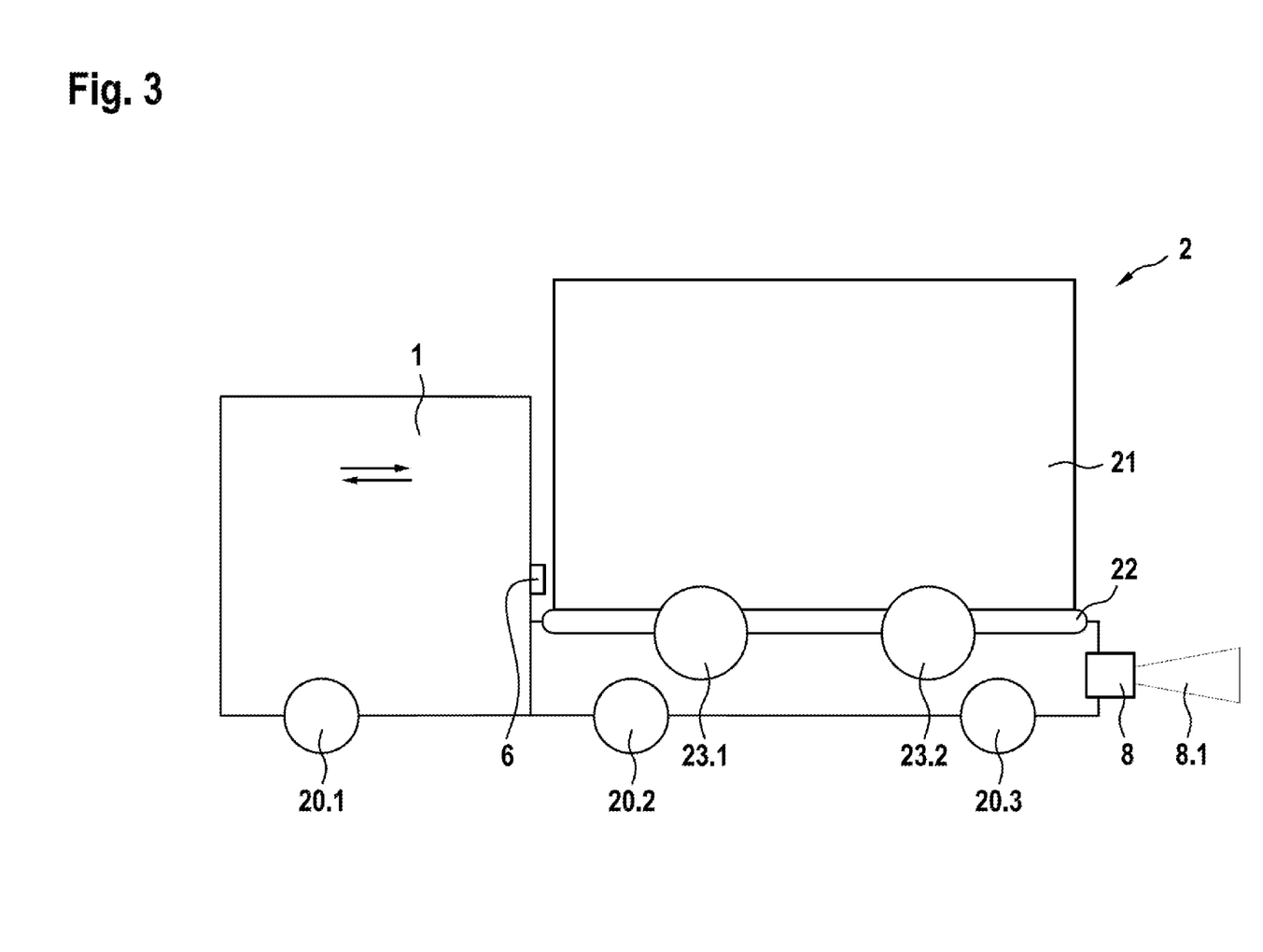
FIG. 3: shows a side view of the industrial truck according to FIG. 1 having loaded load and the laser scanner.

FIG. 3 shows a side view of the industrial truck 1 according to FIG. 1 having a loaded load 2. The load 2 consists here of a cargo 21 and a transport cart 22, using which the cargo 21 can be transported. Wheels of the industrial truck 1 are identified by 20.1, 20.2, and 20.3. Wheels of the transport cart 22 are identified by 23.1 and 23.2. The laser scanner 8 is attached at the rear of the industrial truck 1. The laser field of view 8.1 is oriented in the direction away from the industrial truck 1. A load sensor (location sensor) is identified by 6.

FIGS. 4a, 4b, 4c, 4d, 4e, 5a, 5b, 5c, 5d, and 5e illustrate two embodiments of the operation of the industrial truck 1. A narrow protective field is identified by 24 and a broad warning field of the laser scanner 8 is identified by 25.

FIGS. 4a to 4e illustrate a first embodiment of the operation of the industrial truck provided here. The fundamental sequence logic for this purpose can be summarized as follows:

1. The first control unit 9 specifies the desired travel direction and the velocity to the second control unit 10.
2. The second control unit 10 relays the desired travel direction to the third control unit 11, calculates the target speeds, and specifies them to the motors.
3. Safe SIL2 rotary encoders transmit the actual speeds of the motors to the third control unit 11.
4. The third control unit 11 recognizes if the warning field 25 of the rear laser scanner 8 triggers and switches this laser scanner 8 to a narrower protective field 24.
5. The third control unit 11 calculates the travel distance (safe wheel odometry) from the actual speeds and sets the velocity to v=0 mm/s via the second control unit 10 when the predetermined travel distance (Y) is reached. (The target velocities of the third control unit 11 have priority over the desired velocities of the first control unit 9).

Figure 4A:
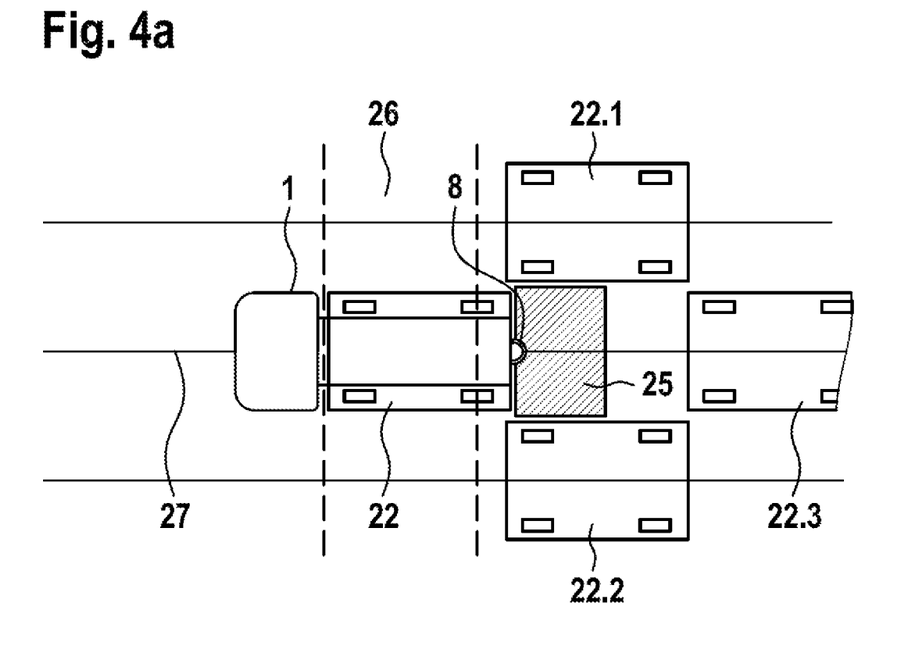
FIG. 4a: show a first embodiment of the operation of the industrial truck provided here.

The Sequence in Detail:

Step 1:

After entering the supermarket, a warning field 25 is added in addition to the protective field 24, by which the unloading position or the closest transport cart 22 (dolly) already located in the supermarket is to be recognized (FIG. 4a).

Figure 4B:
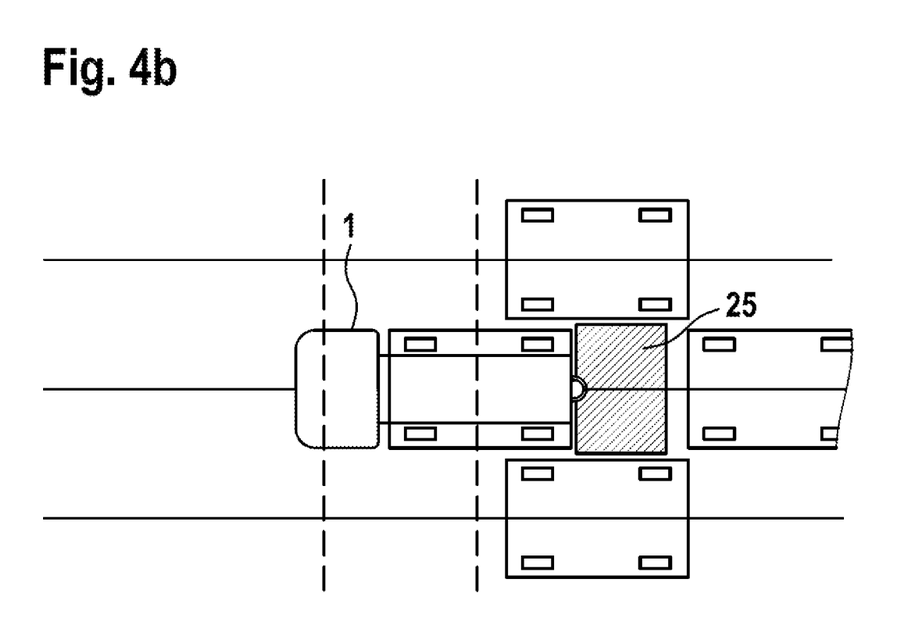
FIG. 4b: show a first embodiment of the operation of the industrial truck provided here.
Figure 4C:
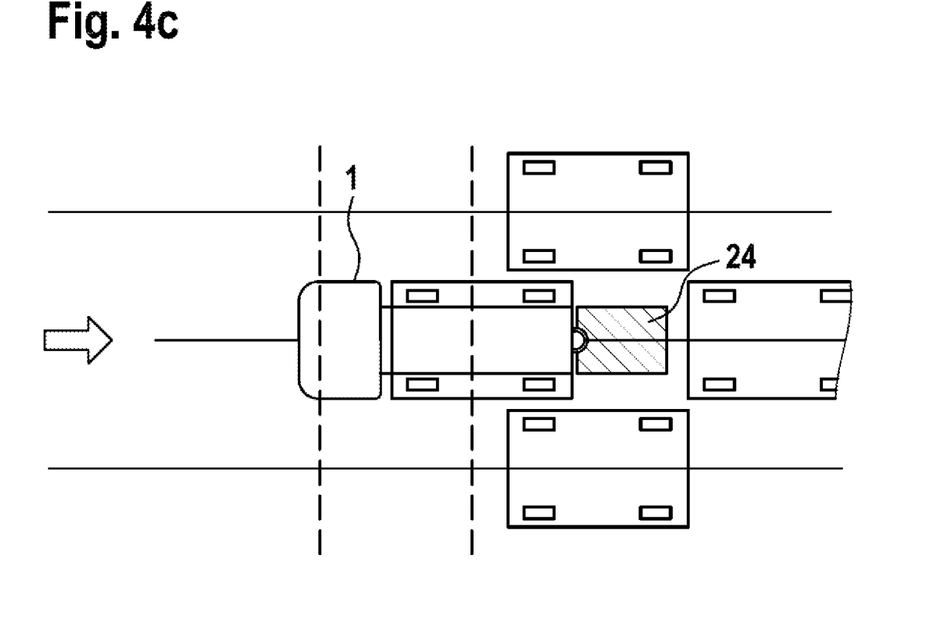
FIG. 4c: show a first embodiment of the operation of the industrial truck provided here.

Step 2:

The industrial truck 1 travels in reverse until the warning field 25 triggers. It then switches to a narrower protective field 24. This protective field 24 enables both the recognition of enclosed persons and also the placement of the transport cart 22 at the already provided (stationary) transport cart

22.1, 22.2, 22.3, because the protective field 24 looks under it in the normal case (FIGS. 4b, 4c).

Figure 4D:
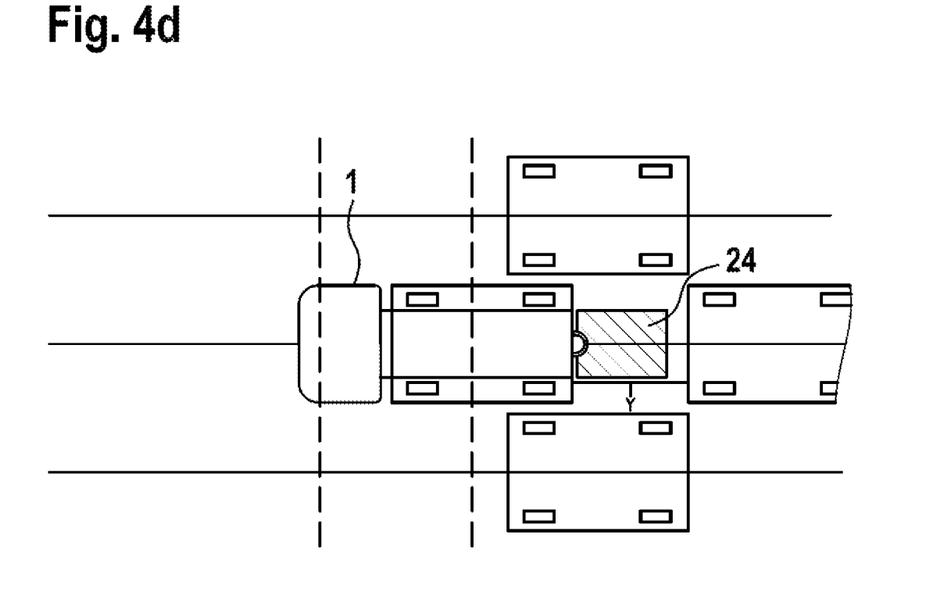
FIG. 4d: show a first embodiment of the operation of the industrial truck provided here.
Figure 4E:
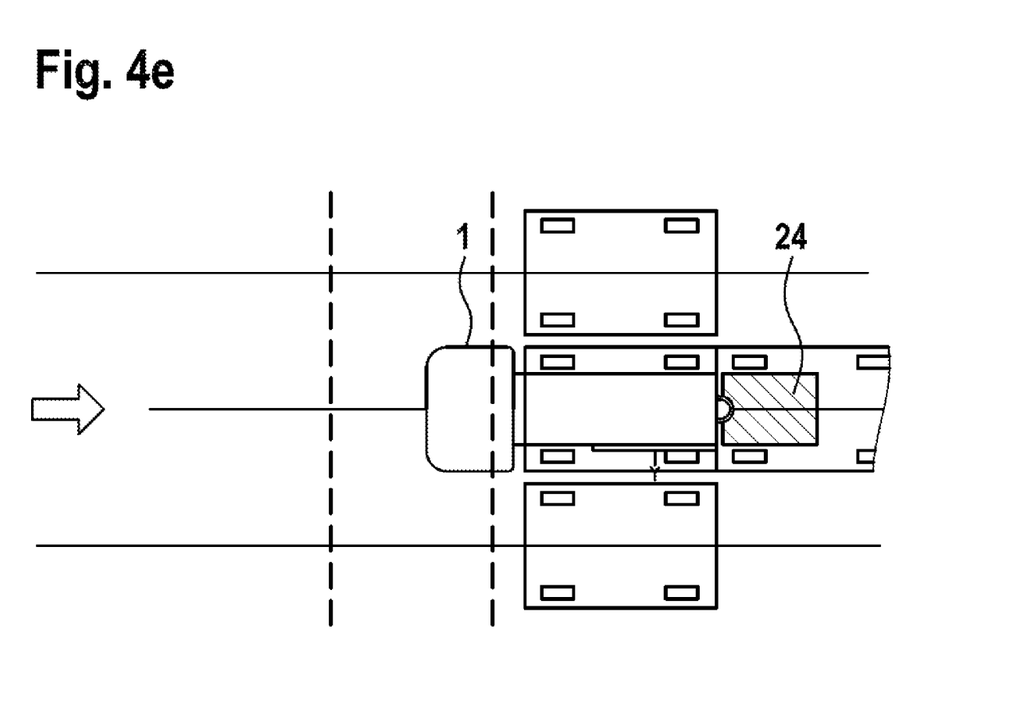
FIG. 4e: show a first embodiment of the operation of the industrial truck provided here.

Step 3:

The industrial truck 1 continues to travel in reverse on a route Y monitored via safe wheel odometry and sets down the transported material (FIGS. 4d, 4e).

After an obstacle in the supermarket has been recognized via the rearward laser scanner 8 (by means of warning field 25), the activation of a narrower protective field 24 enables the recognition of an enclosed person. The industrial truck 1 stops without contact and an additional emergency stop button is no longer required. In the normal case (no enclosed person), the narrower protective field 24 "looks" under the transported material (transport cart 22) on which the loaded transported material is placed, wherein the space in the "supermarket aisle" is optimally utilized.

Particular advantages consist, inter alia, of the increase of the protection of persons during the unloading of a transported material in a danger zone, dispensing with an additional emergency stop button, and reducing the space requirement.

FIGS. 5a to 5e illustrate a second embodiment of the operation of the industrial truck provided here. The fundamental sequence logic for this purpose can be summarized as follows:

1. The first control unit 9 specifies the desired travel direction and the velocity to the second control unit 10.
2. The second control unit 10 relays the desired travel direction to the third control unit 11, calculates the target speeds, and specifies them to the motors.
3. Safe SIL2 rotary encoders transmit the actual speeds of the motors to the third control unit 11.
4. The third control unit 11 calculates the travel distance from the actual speeds (safe wheel odometry), switches the required laser scanner field in dependence on the desired travel direction, and necessarily maintains this for a predetermined travel distance (X).

Figure 5A:
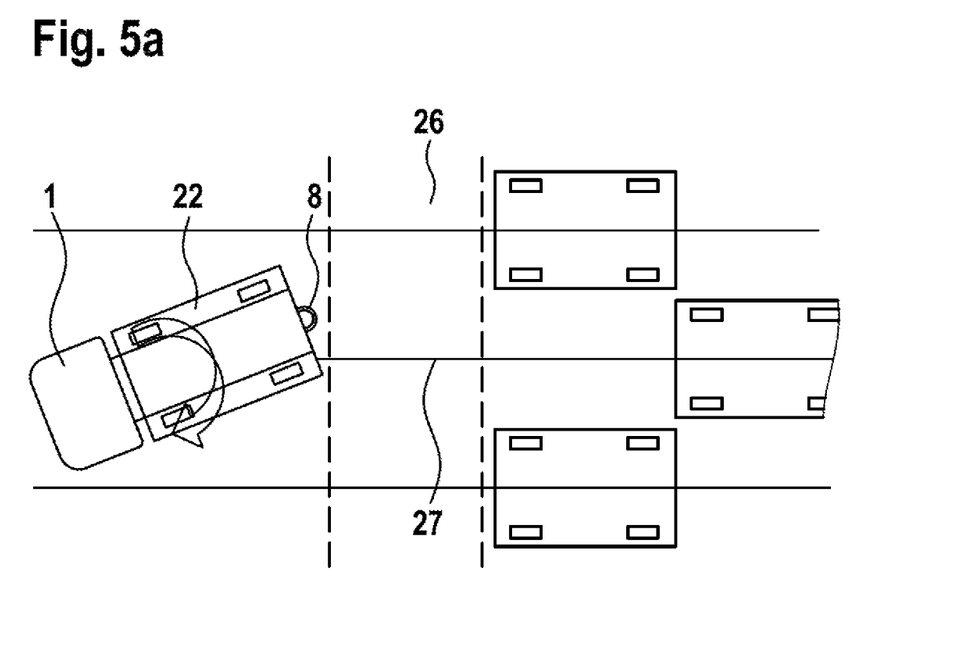
FIG. 5a: show a second embodiment of the operation of the industrial truck provided here.
Figure 5B:
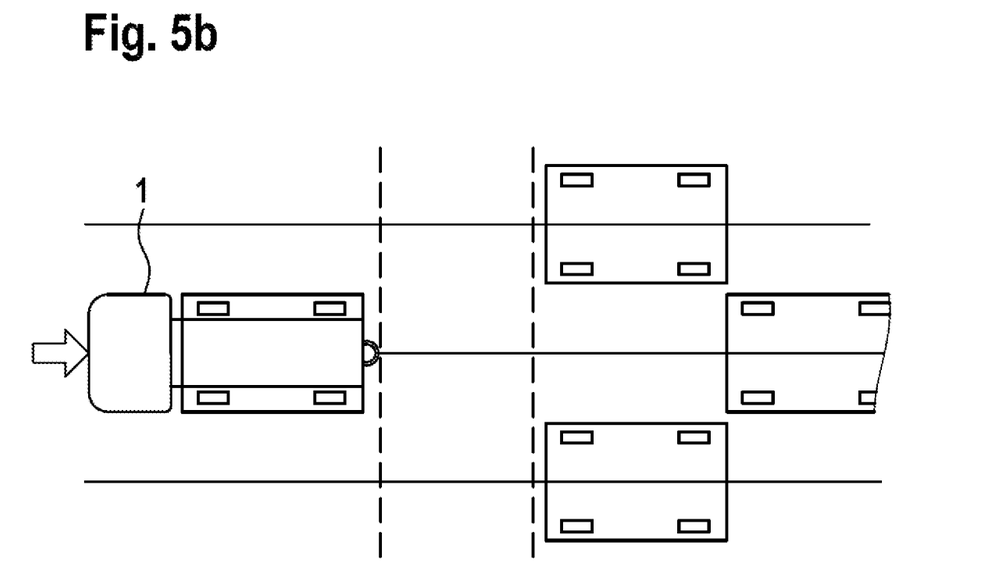
FIG. 5b: show a second embodiment of the operation of the industrial truck provided here.

The Sequence in Detail:

Step 1:

The reverse travel begins after the industrial truck 1 has turned onto the center aisle 27 (FIGS. 5a, 5b).

Figure 5C:
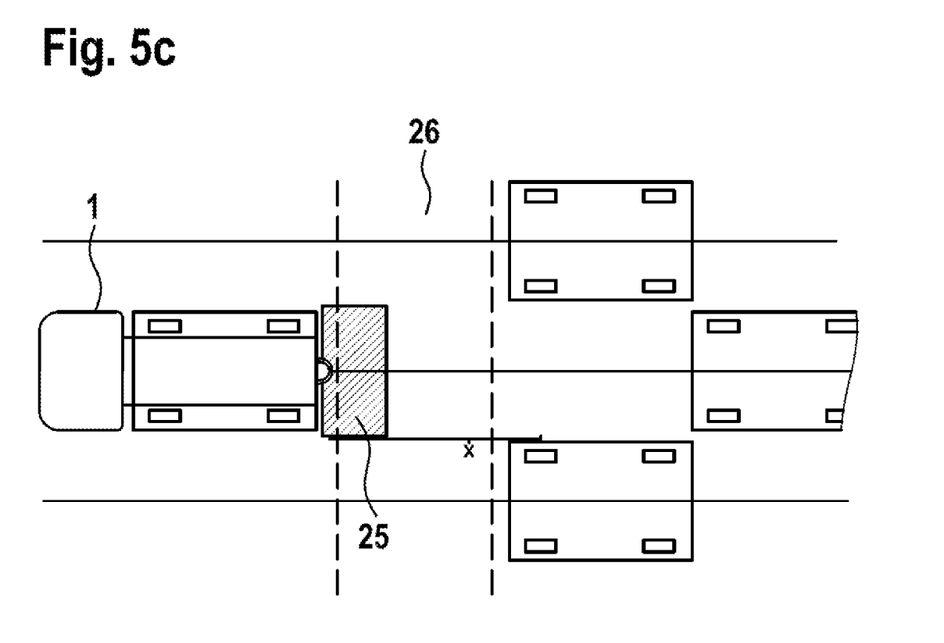
FIG. 5c: show a second embodiment of the operation of the industrial truck provided here.
Figure 5D:
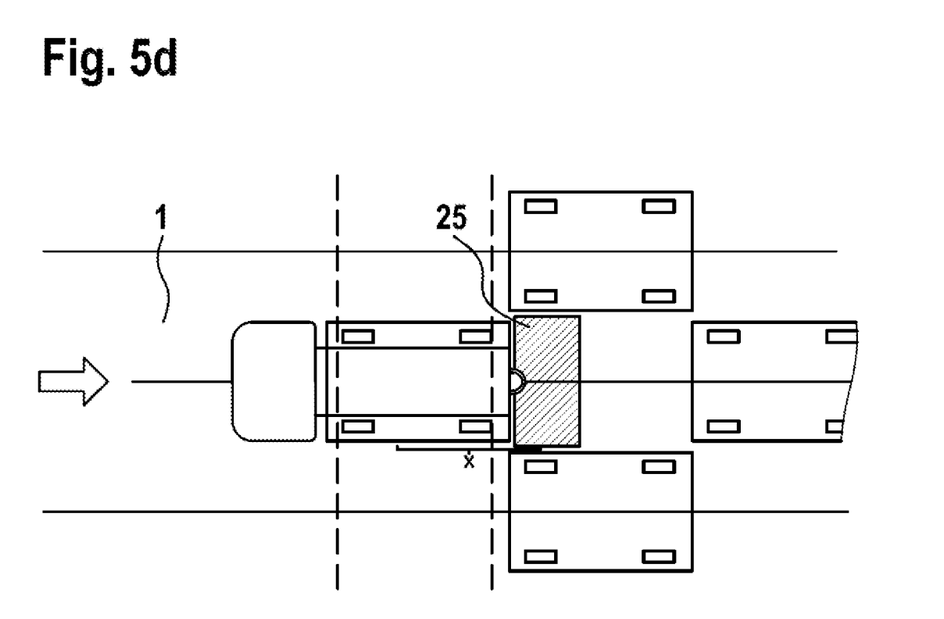
FIG. 5d: show a second embodiment of the operation of the industrial truck provided here.

Step 2:

The protective field 24 of the rear laser scanner 8 is activated and the industrial truck travels a distance of X centimeters in reverse. The X centimeters are monitored via safe wheel odometry and it is thus ensured that the industrial truck has safely entered the supermarket (danger zone) (FIGS. 5c, 5d).

It is ensured by reliably monitored wheel odometry that switching to a narrow protective field 24 only takes place in the danger zone. That is to say that the laser scanner field required to safely traverse the pedestrian path 26 is selected before beginning the reverse travel and necessarily maintained for a predetermined travel distance.

Figure 5E:
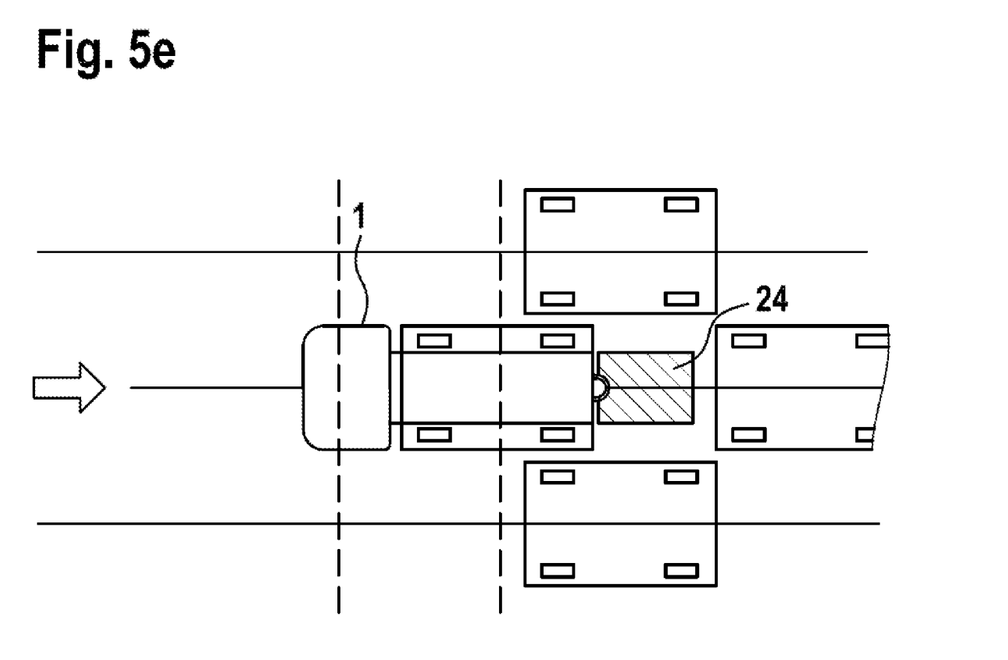
FIG. 5e: show a second embodiment of the operation of the industrial truck provided here.

Step 3:

The industrial truck 1 continues to travel in reverse and sets down the load 2 (transported material). (FIG. 5e).

Safe traversal of pedestrian paths 26 when entering a danger zone is advantageously achieved. Switching off the laser scanner 8 or early switching to the narrow protective field 24 having PLd is thus reliably prevented.

The driverless, autonomously acting industrial truck 1 (AGV) provided here is preferably used, for example, in factories, warehouses, supermarkets, or hospitals. Collisions (in particular with a person and/or an object) and/or losing orientation are avoided due to sensors, for example, laser scanners, inductive proximity sensors, ultrasonic sensors, and/or 3D cameras. For example, pallets, boxes, shelves, individual parts, or small load carriers (SLC) with or without transport cart (dolly) are transported.

LIST OF REFERENCE SIGNS

1 industrial truck
1.1 cargo area
2 load
3 control system
4 evaluation unit
5 detector device
6 load sensor
7 sensor system
8 laser scanner
8.1 laser field of view
9 first control unit
10 second control unit
11 third control unit
12 first motor
13 second motor
14 raising and lowering device
15 first rotary encoder
16 second rotary encoder
17 data-conducting connection
18 braking system
19 storage element
20.1, 20.2, 20.3 wheels of the industrial truck
21 cargo
22 transport cart
22.1, 22.2, 22.3 stationary transport cart
23.1, 23.2 wheels of the transport cart
24 protective field
25 warning field
26 pedestrian path
27 center aisle
A, B movement directions
X, Y routes

What is claimed is:

1. An industrial truck for driverless, autonomously-acting operation for a load to be transported, the industrial truck comprising:
   a control system configured to control and to steer the industrial truck;
   an evaluation unit configured to generate a signal for stopping the industrial truck; and
   a detector device configured to detect obstacles located in a route, the detector device connected to the control system,
   wherein the control system is configured to check a protective field and a warning field of the detector device for the presence of detected obstacles,
   wherein the protective field extends under a detected obstacle,
   wherein the control system is configured to automatically switch from checking the warning field to checking the protective field when the obstacle is detected in the warning field as the industrial truck traverses the route, and the control system is further configured to cause the industrial truck to continue traversing the route after detecting the obstacle when no further obstacles are detected in the protective field.

2. The industrial truck according to claim 1, wherein the control system comprises:
   a first control unit configured to control a desired travel direction and a velocity of the industrial truck;

a second control unit configured to control movement of the industrial truck; and a third control unit configured to control safety of the industrial truck.

3. The industrial truck according to claim 2, wherein the detector device comprises a laser scanner.

4. The industrial truck according to claim 3, wherein the laser scanner is arranged on a rear part of the industrial truck.

5. The industrial truck according to claim 1, wherein the control system comprises the evaluation unit.

6. The industrial truck according to claim 3, wherein the laser scanner is connected to the third control unit.

7. The industrial truck according to claim 3, wherein:
the protective field includes predetermined protective fields of the laser scanner,
the warning field includes predetermined warning fields of the laser scanner, and
the second control unit and the third control unit are configured to check surroundings of the industrial truck for obstacles based on the predetermined protective fields and the predetermined warning fields.

8. The industrial truck according to claim 3, wherein the protective field includes multiple protective fields predefined in the laser scanner.

9. The industrial truck according to claim 8, wherein the third control unit is configured to activate or deactivate the multiple protective fields.

10. The industrial truck according to claim 1, wherein the control system is configured to monitor the route of the industrial truck by wheel odometry.

\* \* \* \* \*